Jan. 10, 1950 J. W. LATCHUM, JR 2,493,981
TREATMENT OF HYDROCARBONS
Filed Sept. 5, 1945

INVENTOR.
J.W. LATCHUM JR.
BY Hudson & Young
ATTORNEYS

Patented Jan. 10, 1950

2,493,981

UNITED STATES PATENT OFFICE 2,493,981

TREATMENT OF HYDROCARBONS

John W. Latchum, Jr., Bartlesville, Okla., assignor to Phillips Petroleum Company, a corporation of Delaware Application September 5, 1945, Serial No. 614,565

4 Claims. (Cl. 183—114.6)

This invention relates to the treatment of hydrocarbon gases. In one of its more specific aspects it relates to a method and apparatus for the prevention of contamination of solid desiccants by heavy ends of hydrocarbon gas streams.

Distillate well fluid usually contains more or less moisture. Some of this moisture may be condensed and removed as liquid water upon cooling well fluid to atmospheric temperature or even to temperatures somewhat higher than atmospheric. Distillate wells are rather deep, so deep in fact that bottom hole temperatures are usually higher than 200° F. or so. At this relatively high temperature considerable water can exist in the vapor phase. Promoting further vaporization of relatively high boiling compounds is the high gas pressure in such deep lying formations. In fact, distillate producing wells are believed to tap subterranean formations containing as a gas hydrocarbons boiling considerably higher than the formation temperature along with lower boiling hydrocarbons, such as methane. Under such conditions formation pressures have been found to be relatively high, for example, of the order of 2000 to 4000 pounds per square inch. As deeper lying formations are penetrated it is reasonable to believe that still higher pressures will be encountered.

Under these extreme conditions of high pressure and relatively high temperature, it is believed that many hydrocarbons and considerable water exist in a gaseous or vapor phase. On account of the relatively low viscosity of gases or more specifically on account of the relatively low resistance to flow of gases in a porous formation it is desirable to produce the hydrocarbons therefrom in the gaseous phase. In addition overall production is much greater since gases can be removed much more nearly completely from pore spaces than can a liquid. Capillarity, surface tension and viscosity, and the like, apparently unite to interfere seriously with removal of liquid oils or petroleum from oil bearing formations.

Recycling operations in the Gulf coastal region are well known. In these operations, wells are produced at as high pressure as possible, valuable hydrocarbons extracted from the well effluent with as little drop in pressure as possible, and the remaining "dry" or "uncondensible gas" pumped back into the formation at another point in an attempt to prevent pressure drop in the formation.

Such distillate well production, as mentioned hereinbefore, usually contains considerable moisture, and it is one object of my invention to provide a method for removing the moisture from such gas prior to low temperature treatment for removal of some condensible hydrocarbons.

Another object of my invention is to provide a method for the efficient and thorough removal of moisture from hydrocarbon gaseous materials.

Still another object of my invention is to provide a method for the efficient removal of relatively high boiling hydrocarbons from gaseous mixtures containing these and lower boiling hydrocarbons and moisture to prevent contamination of solid desiccants subsequently used for moisture removal.

Yet another object of my invention is to provide a method for the efficient removal of heavy ends from high pressure hydrocarbon gases prior to a desiccation step.

Many other advantages and objects will be realized by those skilled in the art from a careful study of the following disclosure and drawing which respectively describes and illustrates my invention.

Figure 1:
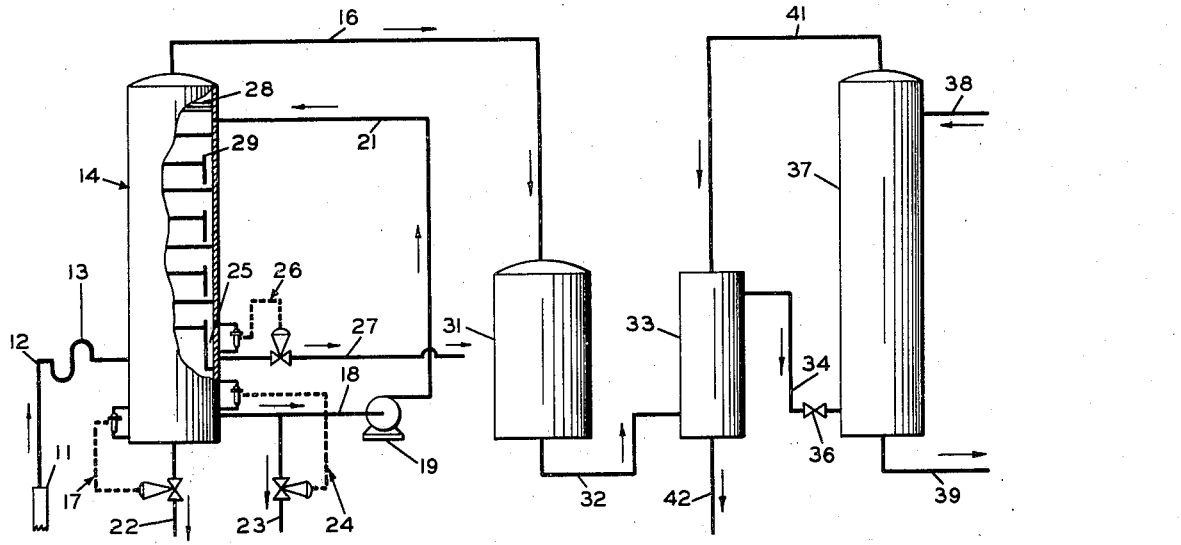
Figure 1 shows diagrammatically one form of apparatus in which the process of my invention may be practiced.

Referring to the drawing and specifically to Figure 1, distillate well effluent leaves a well 11 through a pipe 12, passes through a cooler 13 into a scrubber vessel 14. Scrubbed gas leaves this vessel by way of a high pressure gas line 16 and passes into a vessel 31 filled with a desiccant and leaves this vessel by way of a line 32. The gas passes on through a heat exchanger 33, a line 34 and through an expansion valve 36 into the base of a high pressure absorber 37. Dry gas leaves this absorber by way of a dry gas line 41 and passes into the exchanger 33 and leaves by way of a line 42. From this line 42 the gas may be recompressed to a pressure sufficiently great for recycling into the formation for pressure maintenance.

In the operation of the process of my invention according to the embodiment illustrated by Figure 1, distillate well effluent at well head pressure of, for example, 3000 pounds per square inch, issues from the well 11 and passes by the high pressure gas line 12 through the cooler 13 into the primary scrubber 14. For exemplary purposes I will assume the well head temperature to be approximately 160° F., in many instances distillate wells yield fluid at substantially higher temperatures; and some at lower temperatures, but this value may be taken as a rough average value. On passing through the cooler 13 the well effluent may be cooled to about 100° F. at which temperature it passes into the lower portion of the absorber-scrubber vessel 14.

While distillate well contents at the bottom of the well may be in a vapor state, the produced effluent usually contains some liquid. A well having a well head pressure of 3000 pounds per square inch may have a bottom hole pressure as high as 5000 pounds per square inch, the latter at least in part being dependent upon the depth of the well. Conversely, a well having a bottom hole pressure of 5000 pounds will have a well head pressure less than 5000 pounds by an amount equal to the weight of the column of hydrocarbon in the well bore. During the passage of fluid from the bottom of the well at say this 5000 pounds pressure and at say 200° F. up the well bore, the pressure may be reduced to about 3000 pounds and the temperature to say 160° F. This pressure reduction supplemented by the temperature reduction causes condensation of some vapors by the phenomenon called "retrograde condensation." Thus at the well head there will be some gas and some liquid. This gas-liquid material is the fluid which is passed through the high pressure line 12, and cooler 13 into the scrubber 14. In the cooler further condensation takes place due to the drop in temperature from about 160° F. to 100° F.

When this partly condensed hydrocarbon material enters the scrubber vessel 14, the liquid falls to the bottom while the gases pass upward through the absorbing trays. The accumulated liquid is composed in part of water and in part of hydrocarbon. The water may be withdrawn from the base of this vessel through a water draw line 22. A float controller-valve assembly 17 operates to maintain a constant water level in the vessel. The hydrocarbon accumulates upon the water layer since it is specifically lighter and may be withdrawn through a side draw line 18.

This accumulated hydrocarbon liquid or "condensate" as it is frequently termed is in part transferred from the bottom of the column and pipe 18 by pump 19 through line 21 into top of the same column 14 and deposited upon the top tray. Absorption trays of standard design are fitted into the column so that a gas-liquid absorption step may be carried out. Accordingly, this returned condensate from the top tray drains downward from tray to tray in a normal manner countercurrent to the upward flowing gases. Treated gases or rather gases after contact with the downward flowing condensate exit from the scrubber by line 16.

In this manner the condensate from the bottom of the scrubber 14 acts as an absorbent oil in absorbing condensible hydrocarbons from the gases. It is intended that this operation shall be such as to remove the heavy ends from the gas, which relatively easily condensible ends would otherwise be adsorbed on the adsorbent vessel 31.

The enriched absorbent condensate accumulates in the well 25 and may be removed therefrom by a condensate line 27 at about 3000 pounds pressure to such disposal as desired. A liquid level-valve assembly operates to maintain a constant level of this condensate in the well 25.

When more original condensate accumulates in the base of the scrubber 14 than is needed to serve as absorbent, the float controller-valve assembly 24 operates to remove the excess. According to one method of operation, the pump 19 transfers a definite volume of this condensate to the top tray of the tower such as will be needed for constant volume of gas to be stripped of its heavy ends, and the excess condensate which accumulates will be withdrawn by the float controller-valve assembly 24. This condensate will be removed at about 3000 pounds pressure and disposed of in any manner and for any purpose desired.

The separated and absorbent treated gas issues from the absorber-scrubber through the gas line 16 at about 3000 pounds pressure and at about 100° F. and is conducted to the top of the desiccator vessel 31. In this vessel may be a charge of activated silica desiccant, or bauxite, or other desiccant suited for the purpose at hand. In any event the gas containing such moisture as was not condensed in cooler 13 will enter the desiccator 31. Upon passing from this vessel the gas is intended to be sufficiently free from moisture that it can be treated by a low temperature process for hydrocarbon extraction. Temperature increases slightly in the desiccator, however, not appreciably.

The dried gas from the desiccator passes through line 32 through exchanger 33, line 34 and finally through an expansion valve 36 into the high pressure absorber vessel 37. By countercurrent cooling this dried gas is cooled in the exchanger to about 20° F. Upon passage through the pressure reduction valve the gas expands from about 3000 pounds per square inch pressure to approximately 2000 pounds with an accompanying temperature drop from the +20° F. to about —20° F. The absorber 37 operates for absorption of condensible hydrocarbons at about this pressure of 2000 pounds and at —20° F.

Dry, cold, hydrocarbon gas free from condensibles passes from the absorber 37 through a gas line 41 into the heat exchanger 33. Upon cooling the charge gas to the absorber from about 100° F. to 20° F. this dry gas is warmed from its well below 0° F. temperature to 80° to 85° F. This latter gas, at about the 2000 pounds pressure may be compressed by a compressor, not shown, and recycled into the distillate producing formation for pressure maintenance.

Any absorption oil suitable for high pressure and low temperature absorption may be used in this absorption step. Lines 38 and 39 illustrate diagrammatically the lean absorbent inlet and the rich absorbent outlet lines, respectively. Any suitable and satisfactory method for recovery of hydrocarbons from the rich absorbent may be used. A critical point in this absorption step is that the lean absorbent must be chilled to a temperature preferably below —20° F. to assist in maintaining a desired low temperature in the absorber since absorption is exothermic.

Figure 2:
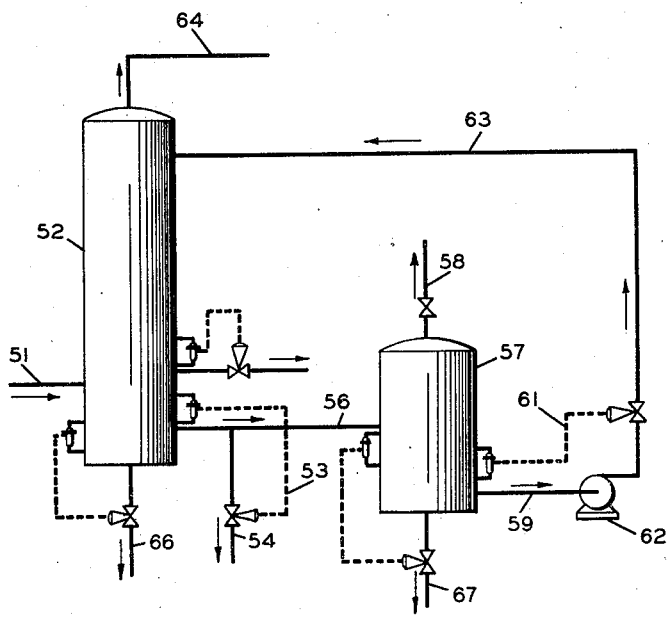
Figure 2 shows a second form of apparatus in which a second embodiment of my process may be practiced.

In the original absorption-scrubbing step in vessel 14, I have found that the separated condensate from the bottom of the vessel serves more efficiently as an absorbent if dissolved gases can be, at least in part, removed. To illustrate this point, refer to Figure 2 of the drawing. A vessel 52 is similar in construction and operation to vessel 14 of Figure 1. Distillate well production enters absorber 52 by a high pressure line 51, water separates in the bottom and is withdrawn through a water draw line 66. Condensate collects on top of the water layer and is removed through a condensate line 56 into a vent tank 57. Vent gases consisting mainly of methane issue through a vent gas line 58 to such disposal as desired. In one operation this vented gas may be combined with the absorber overhead gas in line 64 and the mixture passed through a desiccator vessel such as vessel 31 of Figure 1, prior to the high pressure absorption recovery step.

The venting of this condensate in tank 57 entails some reduction in pressure, thus a pump 62 is necessary for repressuring and transfer of vented condensate from the vent tank through lines 59 and 63 into the absorber 52 as shown. Excess condensate over that needed for the absorption step in absorber 52 may be removed through distillate line 54, or if it is desired to withdraw the condensate after venting the high pressure gas, this condensate may be withdrawn through a line 67 for such disposal as desired.

The overhead gas line 64 conveys the treated well gas to a desiccator similar to vessel 31 prior to the low temperature extraction step.

I have found that desiccants such as activated silica, bauxite and the like, remain active for adsorption of moisture for much longer periods of time when the easily condensible, relatively high boiling hydrocarbons have previously been removed from the gases to be dried.

Previously, some desiccants, when fouled for moisture adsorption by high boiling easily adsorbed hydrocarbons, have been revivified by burning off such hydrocarbon material. It has been found that such burning tends to sinter or otherwise destroy the effective surface of the adsorbent for further moisture removal. For overcoming this disadvantage, it has been the practice of some operators to dispose of the bauxite or silica desiccant when fouled by high boiling hydrocarbons. One great advantage of my method of operation is that by being able to use the activated desiccants for such longer periods of time the cost of this material for a given dehydration job has been materially reduced.

I wish to disclose a high pressure-low temperature scrubbing step as an equivalent to the final high pressure-low temperature step hereinbefore disclosed. The operation of such absorption steps and of such scrubbing steps is well known to those skilled in the art.

In the drawing many valves and other auxiliary equipment such as pressure gages, flow meters, temperature recorders, and the like have not been shown for purposes of simplicity. These auxiliary parts and the points of installation and their operation are well understood by those skilled in the art.

It will be obvious that in the construction of such a system equipment will need be designed to withstand rather high working pressures, such as the 3000 pounds per square inch herein disclosed.

In like manner, the exchanger 33 will need be of such construction as to withstand this high pressure, and temperatures below the freezing point of water.

The absorber vessel 37 will likewise need be designed and constructed for high pressure absorpition at a low temperature of about −20° F.

It will be obvious to those skilled in the art that many variations and modifications of my process may be made and yet remain within the intended spirit and scope of my invention.

Having described my invention, I claim:

1. A unitary process for the extraction of condensible hydrocarbons from a distillate well effluent and characterized by the long operating life of a solid desiccant material used in a desiccation step comprising the steps of extracting easily condensible hydrocarbons from said distillate well effluent, desiccating said extracted effluent by passage through a bed of solid desiccant material, and finally cooling and extracting difficultly condensible hydrocarbons from the dried effluent.

2. The unitary process of claim 1 wherein the step of extracting the easily condensible hydrocarbons comprises passing the well effluent into the lower section of an absorption vessel, and removing gaseous effluent from the upper section of the vessel and liquid effluent being separated from said gaseous effluent in said vessel, removing said liquid effluent from the lower section of said vessel and injecting at least a portion of said removed liquid into the upper section of said vessel and said injected liquid flowing downward in said vessel in countercurrent contact with upward flowing gaseous effluent whereby easily condensible hydrocarbons are condensed.

3. The unitary process of claim 1 wherein the step of extracting the easily condensible hydrocarbons comprises passing the well effluent at substantially well head pressure and at a temperature below about 130° F. into the lower section of an absorption vessel maintained substantially at well head pressure and at said temperature, and removing gaseous effluent from the upper section of the vessel and liquid effluent being separated from said gaseous effluent in said vessel, removing said liquid effluent from the lower section of said vessel and injecting at least a portion of said removed liquid into the upper section of said vessel and said injected liquid flowing downward in said vessel in counter-current contact with upward flowing gaseous effluent whereby easily condensible hydrocarbons are condensed.

4. The process of claim 1 wherein the solid desiccant is bauxite.

JOHN W. LATCHUM, Jr.

REFERENCES CITED

The following references are of record in the file of this patent:

UNITED STATES PATENTS

| Number | Name | Date |
|---|---|---|
| 1,968,899 | Nathan | Aug. 7, 1934 |
| 2,214,678 | Raigorodsky | Sept. 10, 1940 |
| 2,327,187 | Hill | Aug. 17, 1943 |
| 2,364,660 | Reid | Dec. 12, 1944 |
| 2,374,104 | Kirkbride | Apr. 17, 1945 |